United States Patent
Kearns et al.

(10) Patent No.: US 9,897,240 B2
(45) Date of Patent: Feb. 20, 2018

(54) WELD ON INSERT VALVE

(71) Applicant: Team Industrial Services, Inc., Sugar Land, TX (US)

(72) Inventors: J. Patrick Kearns, Richmond, TX (US); Glenn R. Peters, Pearland, TX (US); Darrell Gatlin, Liverpool, TX (US); Keith Kobayashi, Pearland, TX (US); Frede J. Maxwell, Sugar Land, TX (US); Mark Furtado, Friendswood, TX (US)

(73) Assignee: Team Industrial Services, Inc., Sugar Land, TX (US)

( * ) Notice: Subject to any disclaimer, the term of this patent is extended or adjusted under 35 U.S.C. 154(b) by 26 days.

(21) Appl. No.: 15/090,262

(22) Filed: Apr. 4, 2016

(65) Prior Publication Data
US 2016/0305593 A1     Oct. 20, 2016

Related U.S. Application Data (60) Provisional application No. 62/147,719, filed on Apr. 15, 2015.

(51) Int. Cl.
| *F16K 5/18* | (2006.01) |
| *F16L 55/105* | (2006.01) |
| *F16K 5/04* | (2006.01) |
| *F16K 27/06* | (2006.01) |

(52) U.S. Cl.
CPC .......... *F16L 55/105* (2013.01); *F16K 5/0478* (2013.01); *F16K 27/062* (2013.01); *F16K 5/185* (2013.01)

(58) Field of Classification Search
CPC ...................................................... F16K 5/185
USPC ...................................... 137/15.14; 251/161
See application file for complete search history.

(56) References Cited

U.S. PATENT DOCUMENTS

| 733,905 | A | * | 7/1903 | Erdman | ................... F16K 5/166 251/188 |
| 2,612,340 | A | * | 9/1952 | Laurent | .................... F16K 5/185 137/246.13 |
| 5,011,115 | A | * | 4/1991 | Smith | ...................... F16K 5/185 251/161 |

(Continued)

OTHER PUBLICATIONS

Team Industrial Services: Hot Taps and Line Stops, Product Brochure, 2012, swpp 11/12 2500.

(Continued)

*Primary Examiner* — John Fox
(74) *Attorney, Agent, or Firm* — Park, Vaughan, Fleming & Dowler LLP; Shane Nelson (57) ABSTRACT

Embodiments of systems and methods for installing a single valve assembly into in-service pipelines are presented using conventional hot tap technology. In one embodiment, the single valve assembly may comprise a removable cartridge assembly that comprises a wedge assembly that is rotated from an open position to a closed position and movable from a first unexpanded position to a second compressed position that sealingly engages one or more sealing elements to the valve body or housing to prevent fluid flow in the pipeline. The cartridge assembly is configured to be removed from the valve body for repair, maintenance, or replacement without additional line stops or interruptions to the in-service pipeline.

18 Claims, 9 Drawing Sheets

(56) References Cited

U.S. PATENT DOCUMENTS

| | | | |
|---|---|---|---|
| 5,205,535 A * | 4/1993 | Nevrekar | F16K 5/204 251/161 |
| 5,327,923 A * | 7/1994 | Eischen | F16K 43/00 137/15.14 |
| 6,776,184 B1 | 8/2004 | Maichel et al. | |
| 6,983,759 B2 | 1/2006 | Maichel et al. | |
| 7,021,325 B2 | 4/2006 | Maichel et al. | |
| 7,225,827 B2 | 6/2007 | Maichel et al. | |
| 7,311,114 B2 | 12/2007 | Morrison et al. | |
| 7,753,068 B2 * | 7/2010 | Villar Colquell | F16L 41/06 137/15.14 |
| 7,766,047 B1 | 7/2010 | Garrison et al. | |
| 8,307,856 B2 | 11/2012 | Yeazel et al. | |
| 8,601,634 B1 * | 12/2013 | Stunkard | F16L 55/46 137/268 |
| 9,297,487 B2 * | 3/2016 | Borland | F16K 1/00 |

OTHER PUBLICATIONS

T.D. Williamson, Inc.: 1999. Shortstopp 60 Plugging Machines Sizes: 1-1/4" through 12", Bulletin No. 2020.001.00, Feb. 1999.
T.D. Williamson, Inc.: Tapping and Shortstopp 60 Plugging Machine, Equipment Needed to Plug a 1-1/4" Gas Main, Data Sheet No. SS60-1-1/4, Mar. 1999.
T.D. Williamson, Inc.: 2005. Shortstopp Welding Fittings Sizes 1-1/4 through 12 inch, Bulletin No. 2100.003.03, Sep. 2005.

* cited by examiner

WELD ON INSERT VALVE

PRIORITY

This application claims priority to U.S. provisional patent application No. 62/147,719, filed on Apr. 15, 2015, the entire content of which is incorporated herein by reference.

BACKGROUND OF THE INVENTION

Field

This disclosure relates generally to an apparatus and method for inserting valves into a pipeline, and more specifically to an insert valve that may be placed in an in-service pipeline without interruption of service through shutdown or line stops.

Description of the Related Art

Figure 1:
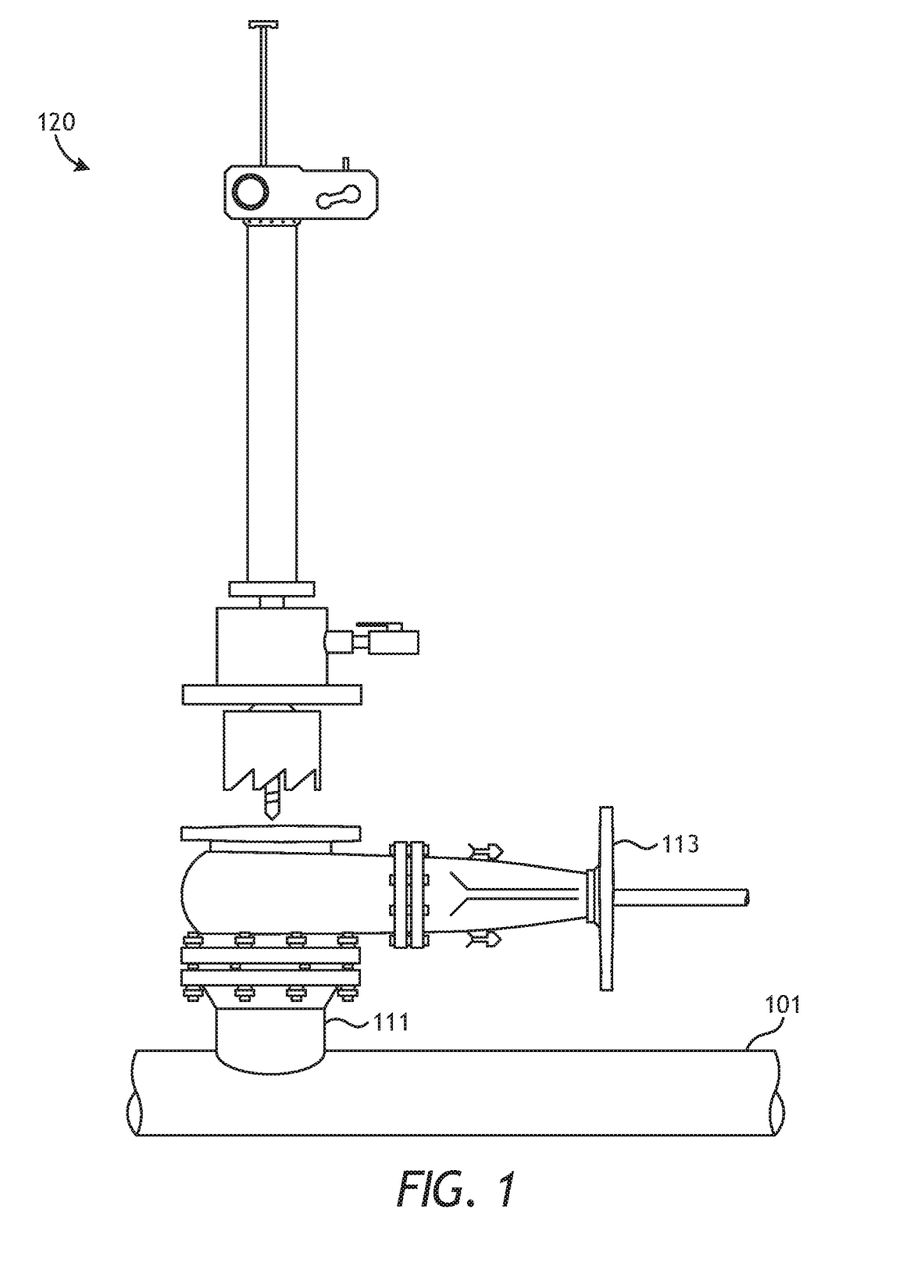
FIG. 1 shows one prior art example of a conventional hot tap machine and related components installed on a pipeline.

Pipelines are used to transport a wide variety of fluids, including water, natural gas, oil, and chemicals. The method of installation for new pipelines (and related components) is completely different than service and repair of existing pipelines. At various times, existing pipes and pipelines need to be inspected, serviced, repaired, and/or maintained. The task of inserting a valve in a line containing fluid under pressure (e.g., a municipal water line or natural gas line) without otherwise shutting down the line during the installation can be expensive, inconvenient, and time consuming. Yet the need to do so is commonplace. In many instances, it is desired to insert a valve into an in-service pipeline. In these situations, "line stops" typically are used to temporarily stop flow of in-service piping systems by insertion of a plugging device and installation of a looped bypass. In general, "hot tapping" is the method of making a connection to existing piping or pressure vessels without the interruption or emptying of that section of pipe, which allows a pipe to be in operation while maintenance or modifications are being done to it. Hot tapping is generally the first step in line stopping. Various types of hot taps, line stops, and other stops are commercially available. FIG. 1 shows standard hot tap machine 120 (installed with a cutter/pilot assembly, hot tap housing bleeder valve, and measuring rod) coupled to temporary valve 113 that is coupled to piping system 101 via hot tap fitting 111.

The Applicant offers a wide variety of hot tap and line stop solutions for making branch connections into operating piping systems, heat exchangers, vessels, columns, and tanks. In general, for a line stop, a fitting is installed around a pipe and a hole is tapped into the pipeline within the fitting. A line stop head or other similar device is inserted into the hole to stop flow, allowing for maintenance or a valve installation. A completion plug or other similar device is locked into place to allow the temporary valve to be removed, and a blind flange is installed to complete the work. Variously specialty line stops are available, such as for insertions into the radius of a pipe, as well as other stops depending on particular needs, such as freeze stops and bag stops. In a typical hot tap setup, a flanged nozzle or fitting is welded or attached to a pipeline and a tapping valve is attached to this flange or fitting. After the necessary valves or fittings are installed, a hole saw or other cutter makes an opening into the pipeline.

Figure 2A:
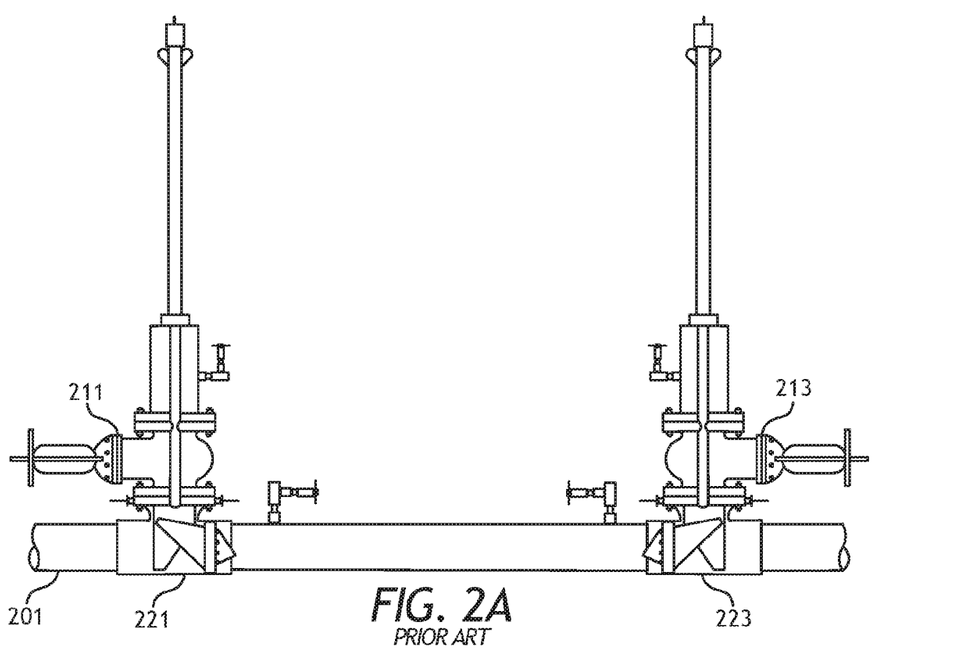
FIG. 2A shows one prior art example of a double line stop.
Figure 2B:
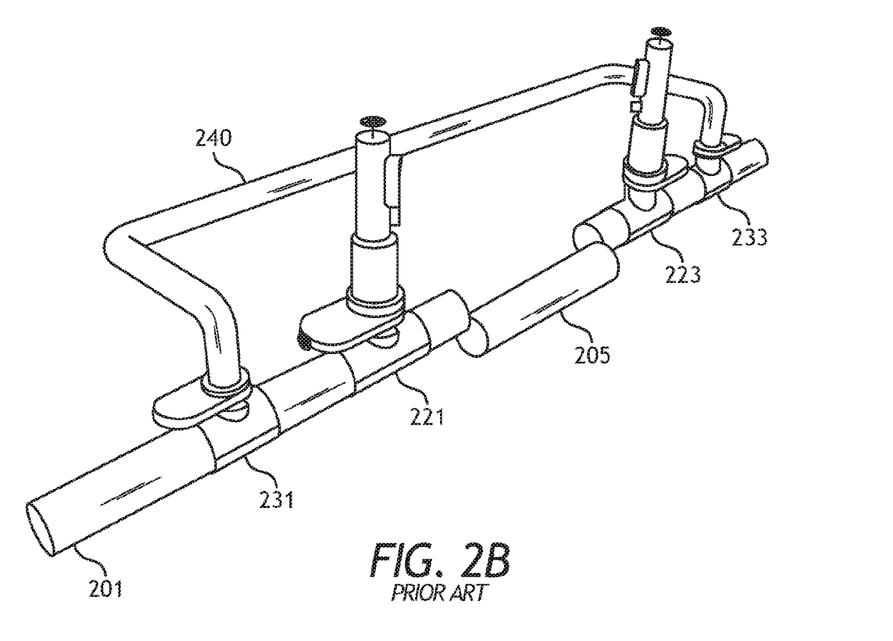
FIG. 2B shows one prior art example of a double line stop with a temporary bypass and removed at the isolated section.

For existing pipelines, conventional installations of a valve and/or repair of a section of pipe require typically multiple isolations, hot taps, and fittings. For example, as illustrated in FIG. 2A, a "double line stop" is a procedure in which two fittings 221, 223 are welded to a section of pipe 201 and temporary valve 211, 213 is installed onto each fitting (such as via a hot tap procedure, described above), after which the two line stops are set and pressure vented. Any work between the two line stops is completed, the line stops are equalized and removed, and completion plugs are set and the temporary valves are removed. A "double block and bleed" is a procedure in which two line stops are set and the pressure vented between and downstream of both line stops. The primary line stop holds the pressure while the secondary line stop ensures a safe seal. Once the work downstream is completed, the line stops are equalized and removed, and completion plugs are set and the temporary valves are removed. For in-service lines, as illustrated in FIG. 2B, a "double line stop" with bypass loop 240 is typically used. Four fittings 221, 231, 223, 233 are welded or bolted to pipeline 201. Temporary valves are installed on each fitting and bypass hot taps and line stop taps are completed. The temporary bypass is installed and the temporary bypass valve is opened. The piping section 205 between the two line stops is de-pressurized and repaired. Once the work is completed, the repaired section is equalized, the line stops are removed, the temporary bypass is removed, and completion plugs are set in the four fittings.

For in-service pipeline repair (pipelines which contain fluid under pressure), it may be necessary to install multiple valves to achieve double block functionality and insertion of a valve. Numerous techniques and equipment exist for such repair. One existing way of inserting a valve into a pipeline without shutting down service starts by cutting a hole in the pipe with a conventional hot-tapping hole saw apparatus. A valving apparatus is then added that forces a rubber plunger into the hole. The rubber plunger expands enough to block the line. Withdrawing the plunger unblocks the line. One problem with the rubber plunger technique is that success of the valving apparatus depends on the internal size and condition of the pipe. In addition, an old, corroded or otherwise damaged and weakened pipe is subject to being broken. Furthermore, pushing a plug through a tapped hole subjects the rubber gate to being cut by the sharp edges of the hole cut in the pipe each time the gate is opened and closed. TDW Services offers a SHORTSTOPP® and STOPPLE® plugging system designed to serve as temporary block valve without interrupting service. For example, in a STOPPLE® train plugging system, a double-block-and-bleed design is used to insert two plugging heads through a single pipeline fitting. Two plugging heads are linked into a "train" to provide the added assurance of two seals at each isolation point. However, the STOPPLE® train plugging system still requires the use of two isolation points. Another known valve is described in U.S. Pat. No. 6,776,184, which describes an insertion valve and installation method that, among other things, provides a gate valve stopping mechanism that is configured to seal without contact to the pipe. Likewise, other known valves do not allow for the removal of the valve's internal components once installed in a pipeline without shutting down the operation.

There is a need for a system that allows the insertion of a valve in an in-service pipeline by installing only a single valve and/or hot tapping at a single location. There is a need for a system that allows for the repair, servicing, replacement, and/or removal of a valve without the use of additional line stops. A need exists for a single valve and insert assembly for in-service pipelines without having to use line stops or additional downstream isolations. A need exists for a single valve assembly that allows a verifiable double block and bleed in an in-service line. A need exists for a valve assembly that does not depend on pipeline wall thickness or condition. A need exists for a valve assembly that allows for full-bore opening for pigging operations and in-line inspection. A need exists for a valve and insert assembly that is less expensive and easier to install than current approaches and still utilizes conventional hot tap and installation equipment. A need exists for a valve to be installed and not expose workers unsafely to open end pipe.

SUMMARY

Embodiments of systems and methods for installing a single valve assembly into in-service pipelines are presented using conventional hot tap technology. In one embodiment, the single valve assembly may comprise a removable cartridge assembly that comprises a wedge assembly that is rotated from an open position to a closed position and movable from a first unexpanded position to a second compressed position that sealingly engages one or more sealing elements to the valve body or housing to prevent fluid flow in the pipeline. The cartridge assembly is configured to be removed from the valve body for repair, maintenance, or replacement without additional line stops or interruptions to the in-service pipeline.

In one embodiment, disclosed is a valve for insertion into a pipeline that comprises a wedge, a first sealing slip coupled to a first side of the wedge, and a second sealing slip coupled to a second side of the wedge. The wedge may have a bore that is at least the diameter of the pipeline such that the valve provides a full bore opening.

The valve may have a first position and a second position. The first position may be an uncompressed position and the second position may be a compressed position of the valve. In the second position the valve may be configured to sealingly engage the first and second sealing slips to a body of the valve, wherein the body is coupled to the pipeline. The first and second sealing slips may move along the wedge sides between the first and second position. In some embodiments, the first and second sealing slips comprises a recessed groove that is configured to hold a sealing ring, such that a first sealing element is located on the first sealing slip and a second sealing element is located on the second sealing slip.

The valve may be moveable between an open position and a closed position such that the bore of the wedge is configured to be substantially in-line with a bore of the pipeline in the open position. The valve may be moveable between the open position and the closed position by a quarter turn of the valve. The valve is configured to be installed in a valve body coupled to the pipeline, such that the valve may be selectively positioned within the pipeline and be coupled to the pipeline without an additional line stop to the pipeline.

In one embodiment, disclosed is a valve system for insertion into a section of an in-service pipeline, comprising a valve body comprising an upper fitting and a lower fitting, and a valve configured to be inserted into the valve body. The upper fitting may be coupled to an upper portion of a pipeline section and the lower fitting may be coupled to a lower portion of a pipeline section. The valve may comprise a wedge, a first sealing slip coupled to a first side of the wedge, and a second sealing slip coupled to a second side of the wedge.

In one embodiment, the valve is configured to be inserted into and retrieved from the valve body while the pipeline is in service. The valve is also configured to be inserted into and retrieved from the valve body without an additional line stop. The valve is rotatable within the valve body without the first and second sealing slips touching the pipeline. Thus, movement of the valve from the open position to the closed position is not dependent upon the pipeline wall thickness, and the valve is configured to seal against the valve body with a plurality of pipeline wall thicknesses. In one embodiment, the valve system is configured to provide a verifiable double block and bleed. The valve system may further comprise an equalization system configured to provide confirmation of double block and seal of the valve system. Such an embodiment may comprise a plurality of equalization valves coupled to the valve body.

In one embodiment, disclosed is a method for inserting a valve in an in-service pipeline, comprising coupling a valve body to a portion of a pipeline, wherein the valve body comprises an upper fitting and a lower fitting, attaching a hot tap machine to the valve body, cutting an opening in the pipeline by using the hot tap machine, and inserting a valve assembly into the pipeline through the opening, wherein the valve comprises a wedge comprising a bore, a first sealing slip coupled to a first side of the wedge, and a second sealing slip coupled to a second side of the wedge. This method may be performed without the need for an additional line stop. The method may further comprise rotating the valve from a closed position to an open position. The method may further comprise actuating the valve from a first position to a second position, such that in relation to the pipeline the valve system is not sealed in the first position and is substantially sealed in the second position. In this embodiment, the first and second sealing slips may be moved in relation to the wedge.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

The disclosed embodiment provides a novel solution to one or more of the industry's needs previously described herein and offers superior advantages over conventional line stops, insert valves, and pipeline servicing solutions. The disclosed embodiments include systems, methods, and apparatuses for inserting a quarter turn full port valve inside an in-service pipeline without additional isolations or line stops. One of ordinary skill will recognize that the described embodiments may be expanded for use in different types of valves and in different uses besides a pipeline application, such as pressure vessels. Further, the valve assembly of the present disclosure can be installed in new pipelines, such that many of the benefits (e.g., repair/replacement of the valve's internal components) of the valve assembly can be realized in subsequent pipeline servicing operations.

The present embodiments generally describe a valve assembly that can be inserted into in-service pipelines without the need for additional isolations (such as line stops or shutdowns) in the pipeline. In an embodiment, the valve is a quarter turn full port valve. In one embodiment, the valve assembly port is full bore allowing for pigging and in-line-inspection tools and operations of the pipeline. In general, the embodiments of this application can be installed with conventional hot tapping machines and installation equipment. In one embodiment, the valve assembly comprises a cartridge that comprises a wedge assembly. In an embodiment, the valve may include a wedge sealing assembly that has a special actuation that ensures the seals of the assembly are not traveled across the pipeline cut opening. Instead of sealing against the pipeline, the wedge assembly seals against the valve body. Thus, the valve is configured to seal against a variety of pipelines without regard to pipeline wall thickness or integrity. In operation, once the sealing slips of the wedge assembly are set, the valve cavity can be relieved, providing a "true" double block and bleed isolation for the pipeline. If used in a valve installation, the cartridge and/or wedge assembly typically remains installed in the body. If used in a line stop situation, once maintenance work is completed the cartridge and/or wedge assembly is removed and a completion plug installed. The valve assembly is configured for repair and maintenance of the valve's internal components without additional line stops or isolation. The wedge assembly is removable through a temporary valve allowing for maintenance of the pipeline or the valve's internal components. As another feature, the valve body can be used as a fitting for a line stop with the downstream slip removed.

FIGS. 1-2 are various drawings illustrating conventional hot tap machines, double line stops, and temporary bypass solutions in the pipeline servicing industry. One of ordinary skill in the art is familiar with the components illustrated therein and methods of use.

Figure 3:
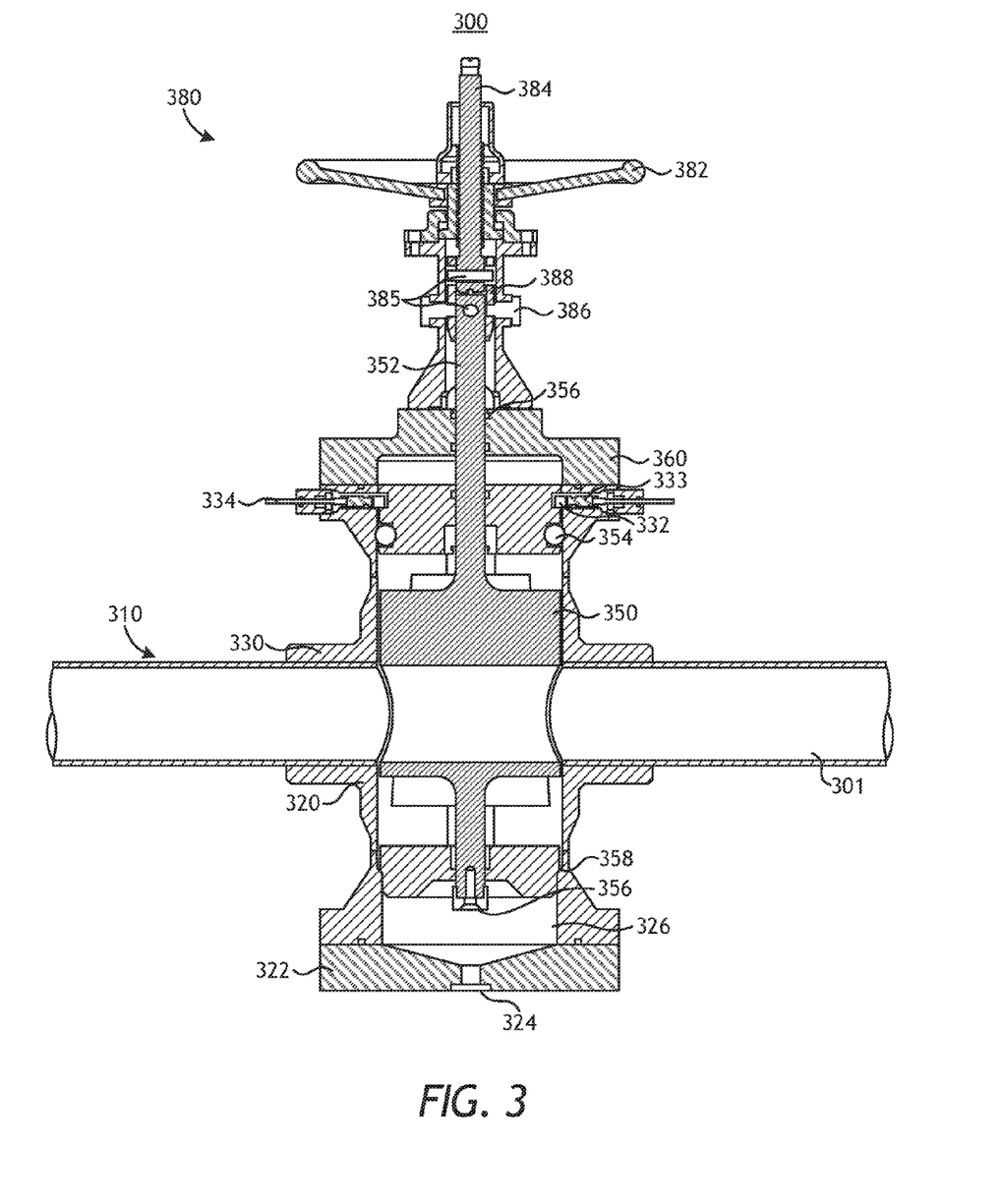
FIG. 3 is a cross-sectional diagram illustrating one embodiment of an insert valve installed in the pipeline.

FIG. 3 is a partial cross-sectional side view of one embodiment of weld-on insert valve 300 that is attached to a portion of pipeline 301 and coupled to valve actuating device 380. While valve 300 is configured to seal against and be used with a plurality of pipeline wall thicknesses, valve 300 is sized for a particular diameter of pipe (such as 4" or 8" pipelines). FIG. 3 shows valve 300 in a fully assembled and installed configuration. In one embodiment, insert valve 300 comprises a cartridge assembly 350 and valve body 310 and is coupled to an actuating device 380. Cartridge assembly 350 (described in more detail in FIG. 4) is configured to be inserted into valve body 310 and is configured to rotate 90 degrees from an open to closed position (and vice versa) by actuating device 380.

Valve housing or body 310 comprises lower fitting 320 and upper fitting 330, which forms a substantially cylindrical cavity for cartridge assembly 350 to be positioned inside of pipeline 301 and body 310. Upper and lower fittings 320, 330 are each configured to be welded on to a section of pipeline 301 and further coupled to each other by a plurality of screws or bolts. In one embodiment, each fitting 320, 330 has one or more portions that extend linearly with the axis of pipeline 301 and one or more sections that extend radially from the pipeline. In still other embodiments, instead of flanges/fittings that are welded onto a section of pipeline, other fittings can be used to connect the insert valve assembly to the pipeline, such as Grayloc® clamp connectors. Such connectors do not require a weld but provide comparable strength and seal integrity of a welded joint.

In one embodiment, lower fitting 320 is coupled to bottom plate 322 by a plurality of screws or bolts. A lower section or cavity 326 of lower fitting 320 is configured to receive metal chips from the pipeline that may result during cutting of the pipeline during a hot-tap procedure. Bottom plate 322 comprises vent port 324 that is coupled to cavity 326. Vent port 324 may be opened to drain and/or retrieve metal chips that fall to the bottom of valve body 310. Vent port 324 also provides the capability to confirm that no flow is flowing past the sealing slips/valve and to otherwise verify that the seals of valve assembly 300 are working correctly and providing a double block. Lower fitting 320 may also comprise stop 358, which acts a mechanical stop to establish a position of the cartridge assembly within valve body 310.

Upper fitting 330 is configured to receive cartridge assembly 350 when the cartridge assembly is being inserted or retrieved from the valve body and/or pipeline. Upper fitting 330 comprises one or more locking mechanisms to lock and/or seal the cartridge assembly and/or valve in the correct position under pressure. In one embodiment, upper fitting 330 comprises one or more half-crescent segments 332 that engage or mate with one or more grooves in cartridge assembly 350 when the cartridge assembly is positioned inside of body 310. Locking devices and/or segments 332 may be configured to sit in a groove on the inside surface of upper fitting 330. One or more tools, such as a segment tool 334, can be used to engage and/or lock segments 332 to cartridge assembly 350 by one or more openings or holes 333 in the sidewall of upper fitting 330. In one embodiment, segments 332 are installed on the inside surface of upper fitting 330 prior to the installation of the fitting on the pipeline and/or prior to a hot tap procedure. In one embodiment, segment tool 334 locks segment 332 into place while cartridge assembly 350 and valve body 310 is under pressure by rotating a sealed screw or bolt through opening 333 to engage segment 332 into a groove of the cartridge assembly.

Still referring to FIG. 3, a valve actuating device 380 is installed on top of valve body 310. Any of a variety of custom or standard valve actuating devices can be used, including mechanical, electrical, and hydraulic actuators. In one embodiment, valve actuating device 380 comprises a valve wheel 382 coupled to a threaded valve screw 384, which is itself coupled to stem 352 of cartridge assembly 350 by cam coupling device 388. In one embodiment, a locking mechanism (such as one or more pins 385) locks cam coupling device 388 to stem 352. Valve screw 384 may be configured to accept any type of valve actuator. Guide bolts/cam screws 386 are used to guide the movement of cartridge assembly 350 rotationally one-quarter turn and axially to compress sealing slips of the cartridge assembly against valve body 310. Cam coupling device 388 is configured to open and close insert valve 300 by rotation of 90 degrees. Valve actuating device 380 may be coupled to upper fitting 330 by bonnet 360 or other flange via a plurality of bolts or screws. In one embodiment, stem 352 of cartridge assembly 350 extends through upper fitting 330, and bonnet 360 may simply be placed over stem 352 such that stem 352 extends through a hole of bonnet 360. One or more stem seals 356 may be coupled to stem 352 to sealingly engage with bonnet 360 or actuating device 380.

Figure 4:
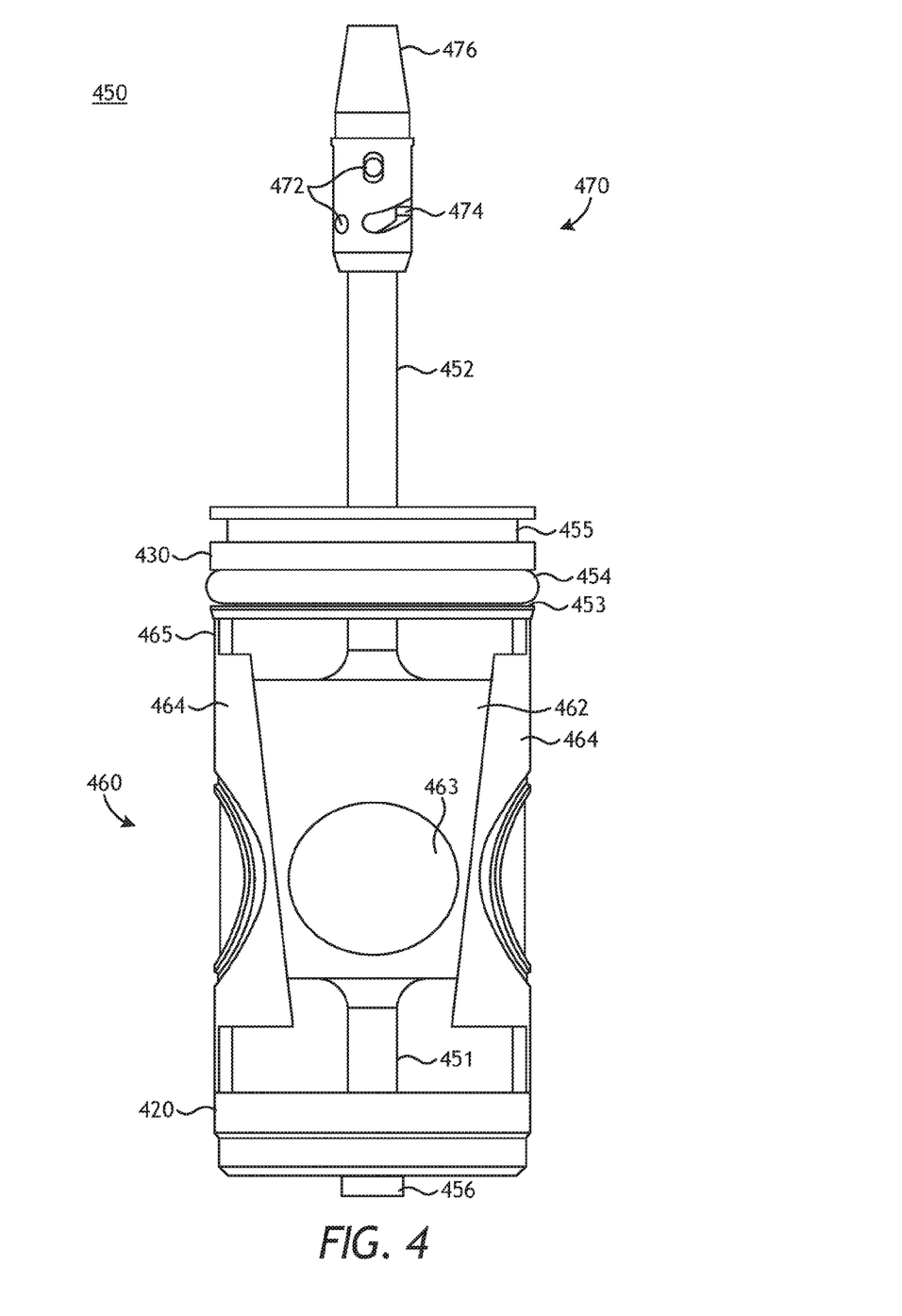
FIG. 4 is a cross-sectional diagram illustrating one embodiment of a cartridge assembly.

FIG. 4 is a cross-sectional diagram illustrating one embodiment of cartridge assembly 450 of weld on insert valve 300. In one embodiment, cartridge assembly 450 is substantially cylindrical and comprises wedge assembly 460, stem 452, trunnion stem 451, lower cartridge plate 420, and upper cartridge plate 430. When installed, upper cartridge plate 430 is configured to be a completion plug. In one embodiment, wedge assembly 460 comprises wedge 462 and a sealing system, which preferably may comprise a plurality of sealing slips 464. Wedge 462 comprises a bore 463 such that when cartridge assembly 450 is in an open position, bore 463 is configured to be in-line with the pipeline bore. In one embodiment, bore 463 is at least as large as the diameter of pipeline bore such that pigs and other in-line inspections tools can pass through bore 463 when valve 300 is installed in the pipeline. Each sealing slip 464 has an incline plane surface that interfaces with a corresponding inclined plane surface of wedge 462. The wedge and sealing slips are coupled to each other via a dovetail configuration (shown in more detail in FIG. 7). Other coupling configurations, such as tongue and groove, may also be used. The dovetail configuration allows wedge 462 to slide up and down sealing slips 464 on the inclined plane coupling. As wedge 462 moves downward and/or is compressed, sealing slips 464 are pushed and/or expanded outward such that sealing slips 464 interface with the inner surface of valve body 310. In one embodiment, sealing slips 464 comprise narrowed portions or tabs 465 that mate with and/or touch the upper and lower cartridge plates, while in other embodiments sealing slips 464 have no such tabs. The upper and lower cartridge plates 430, 420 have a circular cross section, with each plate having a hole in the center of the plate to receive stem 452 and trunnion stem 451, respectively. In one embodiment, stem 452 and trunnion stem 451 are welded to opposite ends of wedge 462. Other ways to couple and/or fasten the stems to the wedge are possible, including threaded and pinned to a boss.

Trunnion stem 451 is a substantially cylindrical protrusion from wedge 462 and acts as a mounting point for and/or supports cartridge assembly 450 and in particular lower cartridge plate 420. The lower portion of trunnion stem 451 is coupled to locking collar 456 via a screw. Locking collar 456 helps maintain the configuration of the cartridge assembly and prevents lower cartridge plate 420 from slipping off trunnion stem 451 and being decoupled from the cartridge assembly. Upper cartridge plate 430 comprises a sealing system and a locking mechanism. In one embodiment, sealing system comprises seal 454 placed in groove 453. Seal 454 couples to the inner surface of upper body 330 to maintain a seal for the valve. In one embodiment, the locking mechanism includes groove 455 that is configured to couple with one or more segments or locking devices 332 (as discussed in more detail in FIG. 3). In one embodiment, lower cartridge plate 420 acts as a bearing surface for cartridge assembly 450. In other embodiments, it helps maintain the sealing slips in the center of the pipeline for fluid flow and sealing and facilitates alignment during installation and operation of the valve. In one embodiment, upper cartridge plate 430 acts as a seal and/or completion plug. Upper cartridge plate 430 may also act as a reaction plate and a centering plate for cartridge assembly 450 during installation and operation of the valve.

Stem 452 comprises and/or is coupled to locking device 470 that is configured to connect or couple to a variety of other devices, such as a holders and actuating mechanism. In one embodiment, locking device 470 comprises a plurality of holes in which a plurality of pins 472 can be inserted to fasten a separate device, such as holder 476 or actuating screw 384 (from FIG. 3). In one embodiment, cam coupler 474 is designed to couple with stem 452 and may include a slotted groove that when engaged with cam screws 386 guides the rotational and axial travel of cartridge assembly 450. Cam coupler 474 allows 90 degree rotation and linear movement of cartridge assembly 450 when it is being rotated, such as by actuating device 380.

Figure 5A:
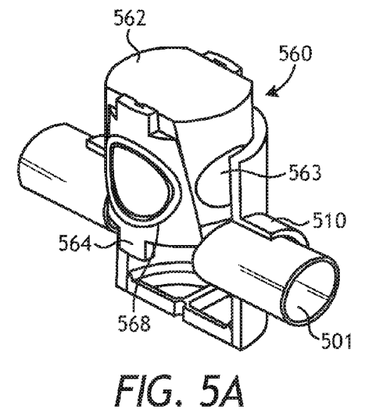
FIGS. 5A-5B show perspective views illustrating one embodiment of a wedge assembly of an insert valve being inserted into a pipeline.
Figure 5B:
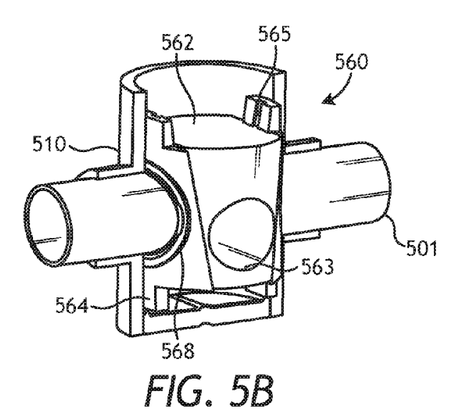

FIGS. 5A-5B show perspective views illustrating one embodiment of wedge assembly 560 of an insert cartridge being inserted into a pipeline 501. FIG. 5A shows wedge assembly 560 prior to its introduction into pipeline 501 and being installed in an "open" position. In one embodiment, wedge assembly 560 is substantially cylindrical and comprises wedge 562, a plurality of sealing slips 564, and at least one seal 568 on each sealing slip. Wedge 562 comprises a hole or bore 563 that allows fluid to pass from one side of wedge assembly 560 to the other side and allows fluid to flow in pipeline 501 when wedge assembly 560 is installed in the pipeline in an "open" position. Such a hole can be drilled or precast/formed in the wedge. FIG. 5B shows wedge assembly 560 after it has been installed in pipeline 501 and rotated to a "closed" position. Once in the "closed" position, wedge assembly 560 may be compressed to move wedge assembly 560 into an expanded position (as shown in FIG. 5B). Compression of wedge 562 expands and/or compresses sealing slips 564 and the sealing rings 568 against valve body 510. Thus, wedge assembly 560 is configured to move from a first position to a second position, such that the second position is configured to expand sealing elements 568 into a sealing arrangement with body 510. In one embodiment, wedge 562 may be formed of carbon steel or other similar material and sealing slips 564 may be formed of carbon steel or ductile iron.

Figure 6:
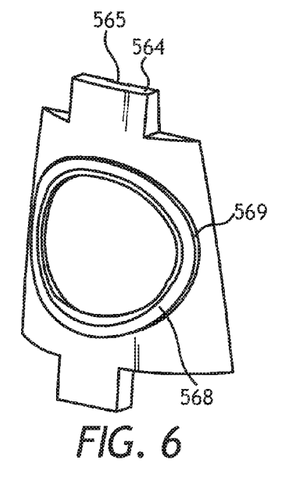
FIG. 6 is a perspective view illustrating one embodiment of a sealing slip of a wedge assembly.

FIG. 6 is a perspective view illustrating one embodiment of sealing slip 564. In one embodiment, wedge assembly 560 comprises two sealing slips 564, attached on opposite ends of wedge 560 via a dovetail configuration. Sealing slip 564 comprises a sealing ring 568 (such as a molded ring) that can withstand temperatures of up to 500° F. and is designed to pipeline specifications. Sealing slip 564 comprises a recessed area or circular groove 569 that is configured to hold seal 568 and is recessed to prevent unintended interaction with valve body 510 and the cut pipeline. Thus, wedge assembly 560 is configured to seal even without seal 568 touching the pipeline or the portion of the pipeline that has been cut (for example, by a hot tapping procedure). Thus, pipeline wall thickness, integrity (e.g., corrosion, etc.), condition (sludge, etc.), or cut edges—issues that would typically cause issues as to sealing elements—does not interfere with the compression of sealing ring 568 against the valve body. Sealing rings 568 are configured to be easily changed, modified, and/or replaced for various services, and can be replaced without additional line stops or interruptions on the pipeline. In one embodiment wedge 562 and sealing slips 564 are coupled to each other via a dovetail configuration, with each sealing slip 564 having groove 565 and wedge 562 having a plurality of tongues or dovetails 567 (see FIG. 7) that each interface with groove 565 on the slips.

Figure 7:
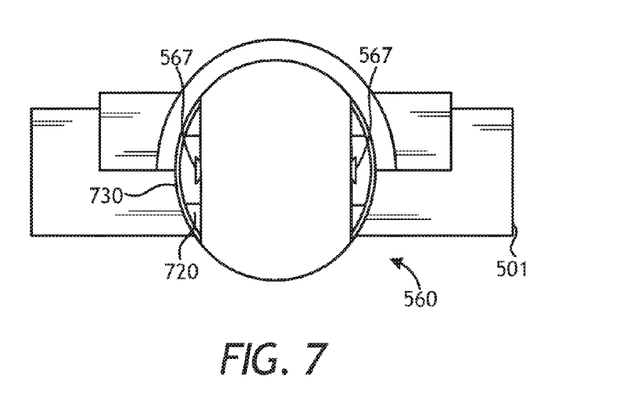
FIG. 7 is a top view illustrating one embodiment of a wedge assembly of an insert valve inserted into a pipeline.

FIG. 7 is a top view illustrating one embodiment of wedge assembly 560 in a closed position. As shown, there is a gap 720 between cut line 730 of pipeline 501 and wedge assembly 560 (including any seals 568). In one embodiment, in an open position the circumferential gap 720 may be as large as 3/16 inch and in a closed position may be as little as zero inches (e.g., seal 568 is in direct contact with body 510). Because of the circumferential gap, wedge assembly 560 is configured to rotate from an open to closed position without sealing rings 568 touching cut pipe 501, thereby preventing damage to the seals. In one embodiment, wedge assembly 560 may be used on a variety of pipes with different wall thicknesses because wedge assembly 560 is not inserted into the main bore of the pipeline and does not seal against the pipeline.

Figure 8A:
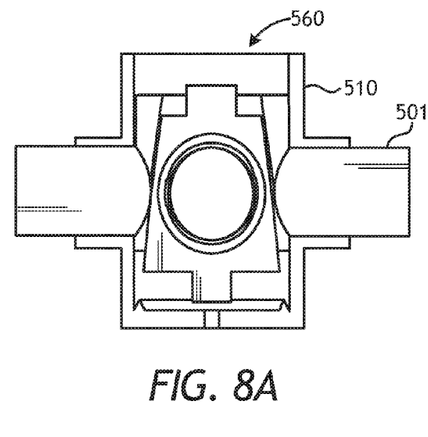
FIGS. 8A-8D show side views illustrating one embodiment of a wedge assembly of an insert valve in multiple positions.
Figure 8B:
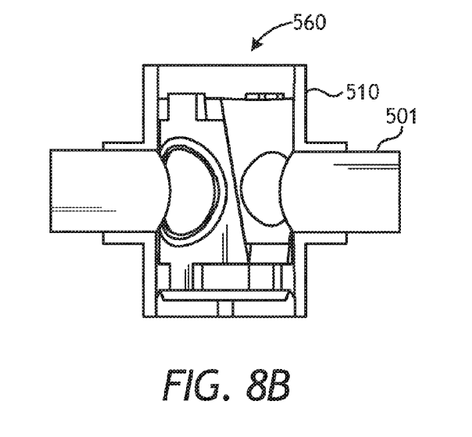
Figure 8C:
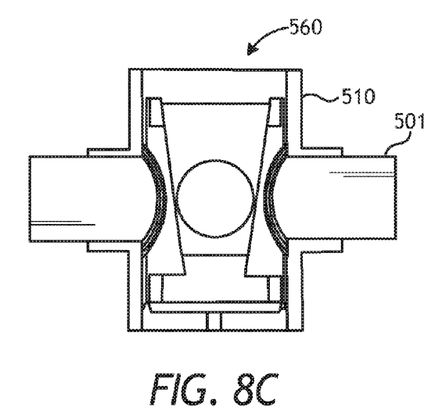
Figure 8D:
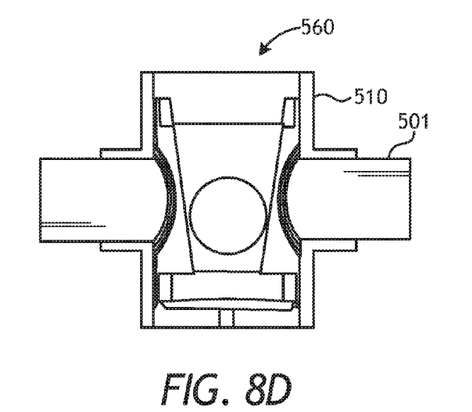

FIGS. 8A-8D show side views illustrating one embodiment of wedge assembly 560 after it has been inserted into valve body 510. FIG. 8A shows wedge assembly 560 after being inserted into valve body 510 and in an "open" position in pipeline 501. Once wedge assembly 560 is inserted in the pipeline, a valve actuator (not shown) may be attached and rotated and/or otherwise actuated to move wedge assembly 560 into a "closed" position. FIG. 8B shows wedge assembly 560 being moved from an "open" position to a "closed" position. As described earlier, wedge assembly 560 is configured to rotate without the sealing rings touching the cut pipe 501. FIG. 8C shows wedge assembly 560 in the "closed" position with wedge assembly 560 in an "uncompressed" position. FIG. 8D shows wedge assembly 560 in the fully "closed" position with wedge assembly 560 in a "compressed" position. As described earlier, when wedge assembly 560 is in a compressed position, the sealing slips 564 are extended and the sealing rings 568 are moved into a sealing position with body 510. In one embodiment, the seals 568 provide full contact against the surface of body 510. In one embodiment, the inner surface of body 510 is configured to be round and smooth such that sealing elements 568 can form a complete seal against that surface.

Figure 9:
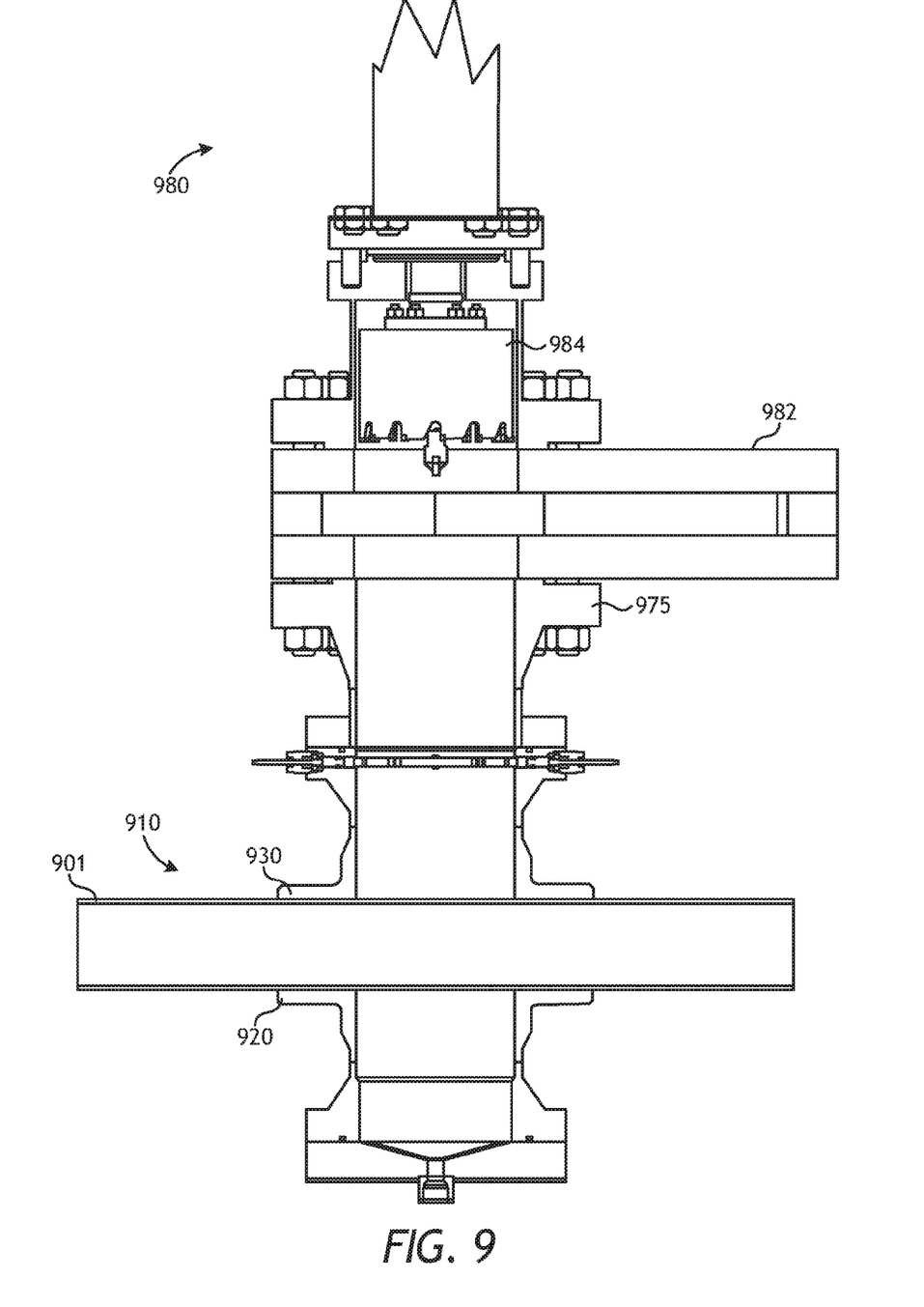
FIG. 9 is a partial cross-sectional diagram illustrating one embodiment of a hot tap machine coupled to the body of an insert valve.

Referring now to FIG. 9, in operation, valve body 910 is installed on a portion of a pipeline. In one embodiment, upper fitting 930 is placed and secured to the upper portion of pipeline 901, and lower fitting 920 is raised into proper arrangement with upper fitting 930 around pipeline 901. In one embodiment, alignment pins, knock-off ears, and other components known to those of skill in the art may be used to facilitate arrangement and placement of body 910. In one embodiment, body 910 is aligned such that the valve can be inserted from a substantially vertical up position (e.g., a 12 o'clock position). Because the valve and/or cartridge assembly seals against valve body 910, a very smooth low profile weld surface of the valve body is desired. In one embodiment, valve body 910 may be welded to the pipeline using conventional methods. In other embodiments, a consumable insert is used to weld valve body 910 to the opposing weld body, which provides a repeatable internal flush weld bead profile with complete penetration without suck back or excess penetration. This technique provides smoother welds than many conventional welding techniques in the portions of the valve body that the cartridge assembly will seal against (such as the joining point of the upper and lower fittings). In still other embodiments, the use of Solar Flux (such as by JW Harris) is used in the welding process, which acts as a gassing agent that eliminates oxidation of the internal surface during welding, which helps provide minimal defects and a smooth internal seating surface. Solar Flux may be applied to the inner diameter of the weld areas on valve body 910. In still other embodiments, a consumable insert and solar flux can be combined to provide an even smoother internal weld profile.

Once valve body 910 has been installed to pipeline 901, a conventional hot tap machine assembly 980 (including temporary valve 982) may be coupled and/or attached to the valve body. In one embodiment, adaptor spool 975 is utilized to mate and/or couple the bolt arrangement of upper fitting 930 to a bolting arrangement used by the hot tap machine. As is known in the art, in one embodiment, hot tap machine assembly 980 comprises a temporary valve and/or hot tap valve 982 and a special dimensioned cutter/pilot assembly 984 that is configured to make a precision cut across pipe 901. More components, such as a hot tap housing, one or more bleeder valves, and a measuring rod, may be used. A hot tap is performed via conventional procedures for the specific hot tap machine being used. Once a hot tap is complete, cutter assembly 984 is retracted into the hot tap housing, temporary valve 982 is closed, pressure is vented from the hot tap machine, and the hot tap machine components can be removed.

Figure 10:
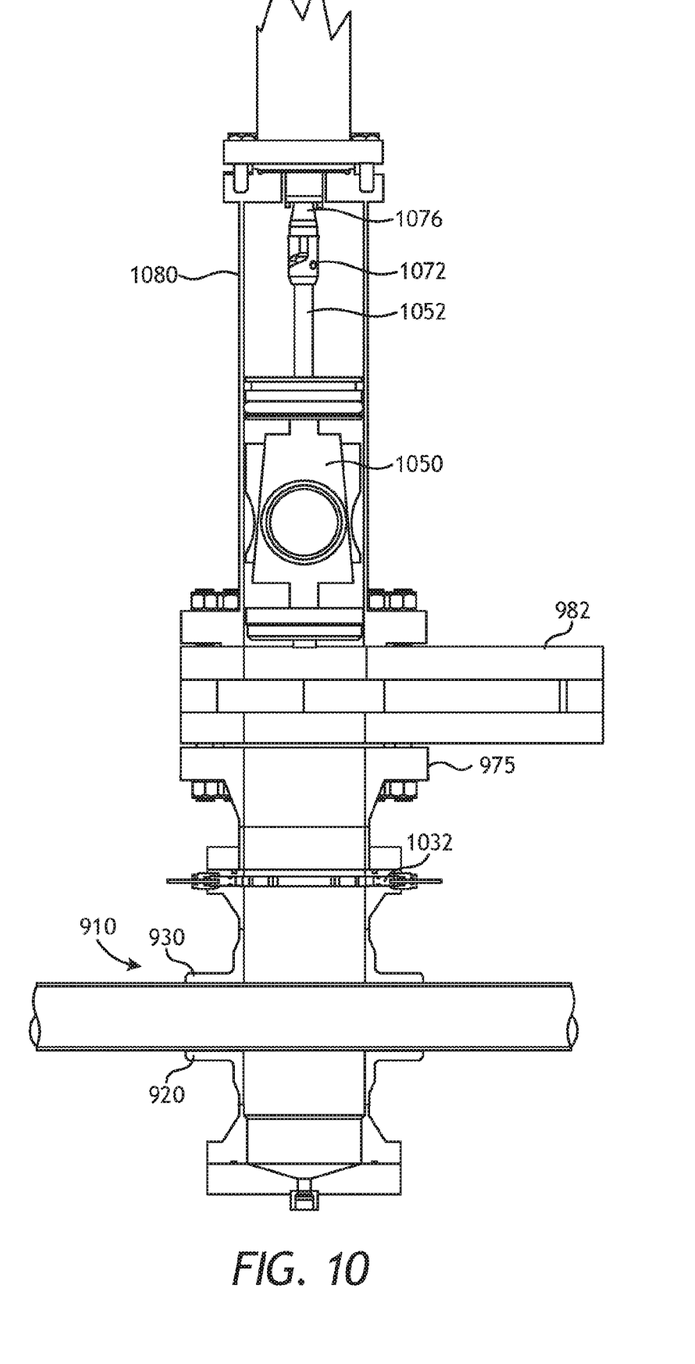
FIG. 10 is a partial cross-sectional diagram illustrating one embodiment of a cartridge assembly being installed into the body of an insert valve.

Referring now to FIG. 10, cartridge assembly 1050 (which may be substantially similar to cartridge assembly 450 and/or wedge assembly 560) can be inserted into cartridge insertion housing 1080 (or other device that allows entry of the cartridge assembly into valve body 910) and lowered or retracted into valve body 910 to confirm proper positioning and orientation of cartridge assembly 1050 within valve body 910 and that the bore through the cartridge assembly is in line with the bore of the pipeline. In one embodiment, holder 1076 can be secured to stem 1052 of the cartridge assembly by one or more pins 1072. A measuring rod (not shown) is used to facilitate positioning of cartridge assembly 1050 within valve body 910. In one embodiment, measurements can be taken to and recorded on the measuring rod to verify the distance until cartridge assembly 1050 is properly set within body 910. Once in the set position, locking segments 1032 can be engaged to lock and/or secure cartridge assembly 1050 in place in relation to the valve body. Cartridge assembly 1050 can be extended and retracted to ensure proper engagement within the body. Once cartridge assembly 1050 is installed, cartridge assembly 1050 can be released and the hot tap machine removed, along with any auxiliary equipment such as temporary valve 982 and spool adaptor 975. Holder 1076 can be de-coupled from the stem of cartridge assembly 1050, such as by removing any securing device such as a pin.

Referring now to FIG. 3, to complete valve installation and install the actuating mechanism, top bonnet 360 is attached to upper body fitting 330 with a plurality of screws or bolts. An actuating mechanism 380 is coupled and secured to stem 352 with one or more securing devices, such as a latch, pin, clamp, or other similar device. In one embodiment, actuating mechanism 380 comprises a threaded shaft 384 that is coupled to stem 352 via cam coupling 388, and wheel 382 is coupled to threaded shaft 384. Actuation (or turning) of wheel 382 causes cartridge assembly 350 to rotate up to 90 degrees from a closed to an open position (and vice versa). The valve can be moved to an open or closed position as appropriate, which allows additional pipeline maintenance as necessary. Removal of the cartridge assembly occurs in a generally reverse manner as that described herein. In one embodiment, cartridge assembly 350 may be removed and serviced or repaired or replaced (such as replacing O-ring seals or any other components to cartridge assembly), as necessary, and such a procedure may be done without additional line stops or interruptions to the pipeline. While the embodiments described herein are particularly useful for in-service pipelines, the weld on insert valve assembly can be used in new installations on pipelines, which allows for subsequent repairs to the valve without additional line stops or interruptions to the pipeline.

Figure 11A:
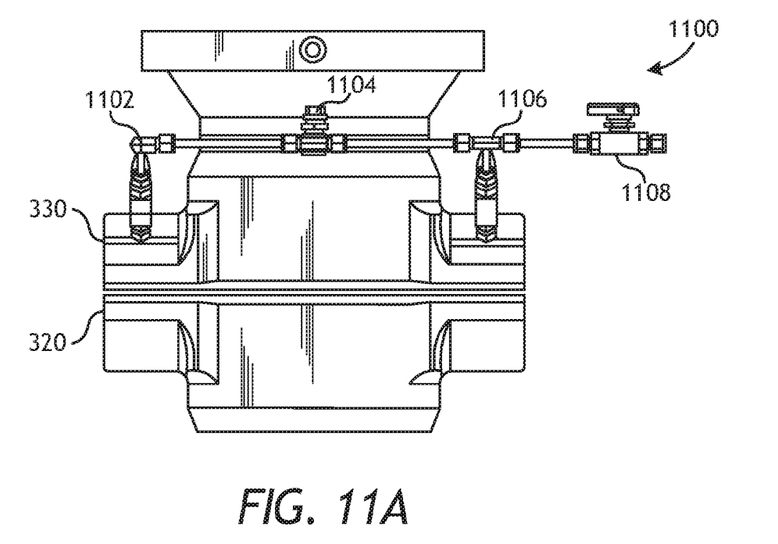
FIGS. 11A-B show multiple views of one embodiment of an equalization system coupled to an insert valve.
Figure 11B:
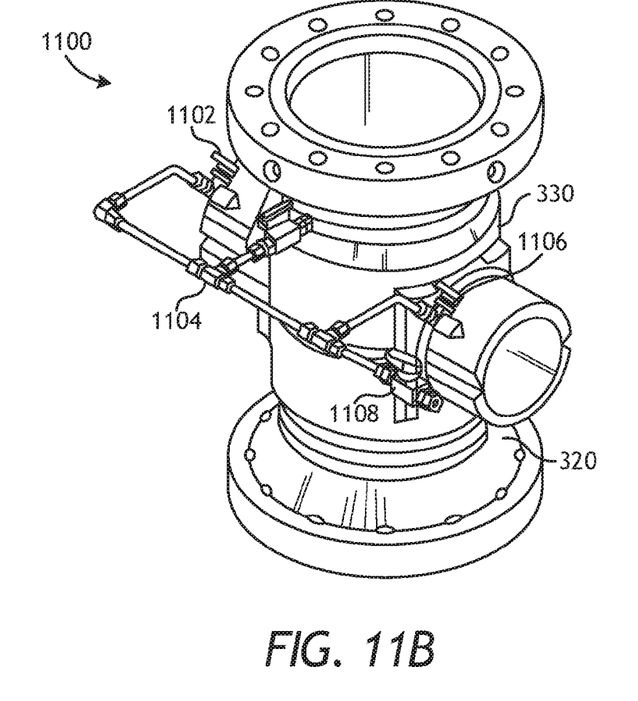

In other embodiments, a series of valves and other pipeworks is coupled to the disclosed insert valve assembly for pressure testing and seal verification. FIGS. 11A-B show various perspective drawings of one embodiment of an equalization valve system that may be coupled to the disclosed insert valve assembly. The equalization valve system 1100 may be used to verify that—once the sealing slips are actuated in the closed position—a double block and bleed exists. Equalization system 1100 comprises a plurality of valves, and in one embodiment comprises four valves: an upstream equalization valve 1102, a downstream equalization valve 1106, a cavity equalization valve 1104, and an equalization valve 1108. Each valve is in fluid connection with the other valves via at least one conduit. The valves may all be inserted on the upper fitting 330, or some/all may be also disposed on the lower fitting 320. With the upstream and downstream valves 1102 and 1106 closed and maintaining pressure against the sealing slips, the center valve 1104 is vented to the atmosphere by means of equalization valve 1108. This provides confirmation of a double block and seal for the insert valve assembly system. The equalization system 1100 provides additional protection to the operators of the valve such that when upstream valve 1102 and cavity valve 1104 are open, pressure will not increase in the cavity section when the insert valve is in a closed position due to temperature or other conditions. When the insert valve is being moved from the closed to open position, one or more of the plurality of equalization valves may be opened to relieve the differential pressure downstream of the insert valve and allow the actuator to complete the stroke.

Although the invention(s) is/are described herein with reference to specific embodiments, various modifications and changes can be made without departing from the scope of the present invention(s). Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of the disclosed invention.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A method for inserting a valve in a pipeline, comprising:
    coupling a valve body to a portion of an in-service pipeline, wherein the valve body comprises an upper fitting and a lower fitting;
    attaching a hot tap machine to the valve body;
    cutting an opening in the pipeline by using the hot tap machine; and
    inserting a valve into the pipeline through the opening, wherein the valve comprises
    a wedge comprising a bore;
    a first sealing slip coupled to a first side of the wedge; and
    a second sealing slip coupled to a second side of the wedge.

2. The method of claim 1, wherein each of the first and second sealing slips comprises a recessed groove that is configured to hold a sealing ring.

3. The method of claim 1, wherein the valve comprises a first sealing element located on the first sealing slip and a second sealing element located on the second sealing slip.

4. The method of claim 1, wherein a diameter of the bore is configured to be at least the diameter of the pipeline.

5. The method of claim 1, further comprising moving the valve between an open position and a closed position such that the bore of the wedge is configured to be substantially in-line with a bore of the pipeline in the open position.

6. The method of claim 1, wherein the valve is moveable between an open position and a closed position by a quarter turn of the valve.

7. The method of claim 1, wherein each of the first and second sealing slips comprises an inclined surface that couples to an inclined surface of the wedge.

8. The method of claim 1, wherein the first and second sealing slips are coupled to the wedge in a dovetail configuration.

9. The method of claim 1,
    further comprising rotating the valve body between a closed position and an open position, such that the bore of the wedge is configured to be substantially in-line with a bore of the pipeline in the open position.

10. The method of claim 1, further comprising actuating the valve between a first position and a second position, wherein the first and second sealing slips travel along the wedge between the first and second position.

11. The method of claim 1, wherein the inserting step comprises inserting the valve into the valve body without an additional line stop to the pipeline.

12. The method of claim 1, further comprising rotating the valve within the valve body without the first and second sealing slips touching the pipeline.

13. The method of claim 1, wherein the valve is configured to seal against the valve body with a plurality of pipeline wall thicknesses.

14. The method of claim 1, further comprising actuating an equalization system to provide confirmation of double block and seal of the valve.

15. The method of claim 1, further comprising actuating the valve from a first position to a second position, such that in relation to the pipeline the valve is not sealed in the first position and is substantially sealed in the second position.

16. The method of claim 15, wherein the second position is a compressed position of the valve.

17. The method of claim 15, wherein the second position is configured to sealingly engage the first and second sealing slips to a body of the valve.

18. The method of claim 1, further comprising moving the first and second sealing slips into a sealing arrangement with the valve body.

\* \* \* \* \*